May 8, 1928.
B. M. JENSEN
PUMP
Filed Nov. 6, 1924
1,669,130
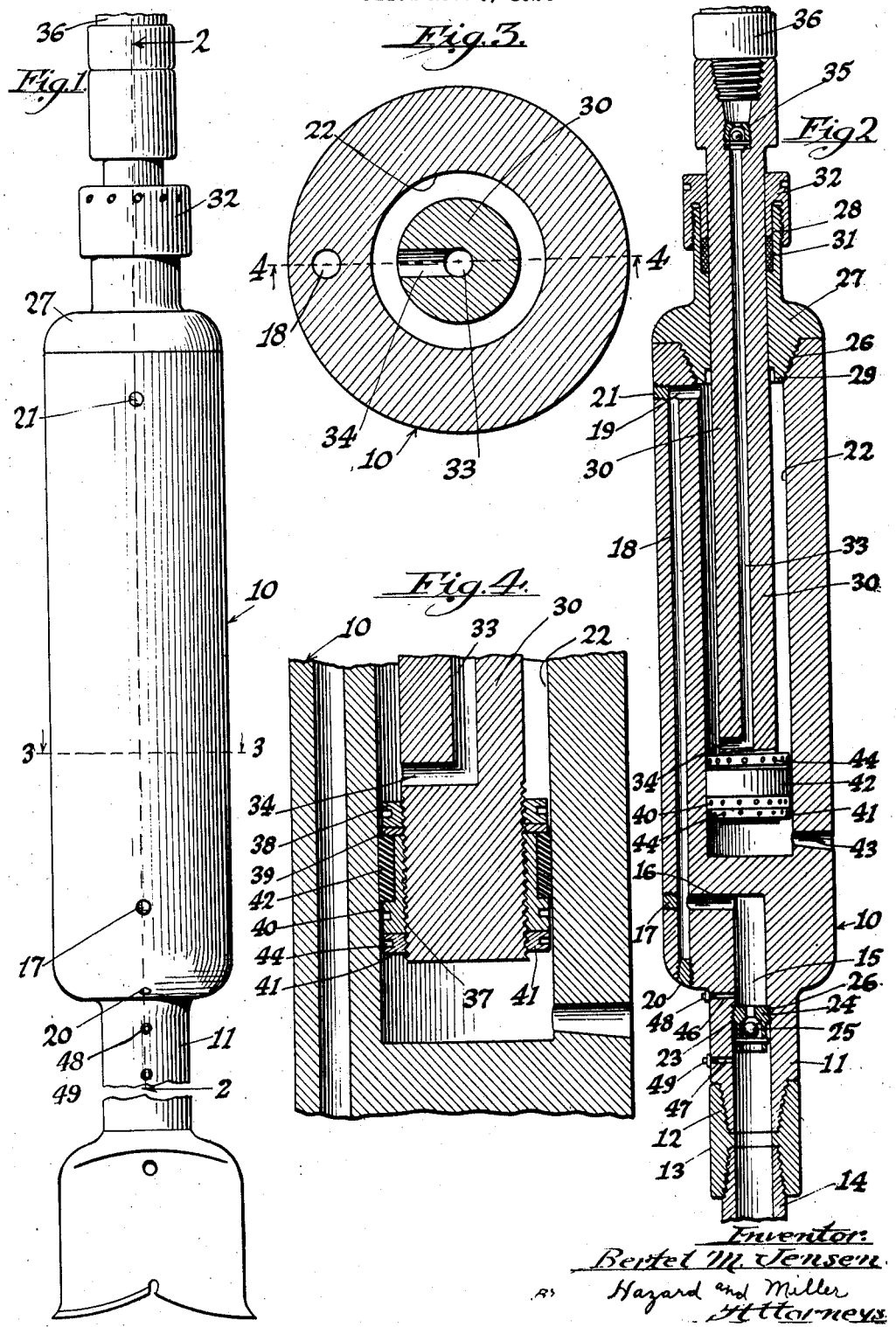

Patented May 8, 1928.

1,669,130

UNITED STATES PATENT OFFICE.

BERTEL M. JENSEN, OF REDONDO BEACH, CALIFORNIA.

PUMP.

Application filed November 6, 1924. Serial No. 748,103.

This invention relates to improvements in pumps.

Frequently during the process of drilling deep wells, such as oil wells, it becomes desirable to increase the pressure of circulation fluid downwardly through the drill tubing. The ordinary slush or mud pump is capable of delivering a pressure ordinarily of about 300 to 350 lbs. per square inch. However, in some cases it is desirable to increase the pressure at which the circulation fluid is admitted to the drill tubing considerably over this amount. Such cases frequently occur when the drill at the bottom of the drill tubing becomes plugged and it is desired to bring out the discharge passages in the drill without pulling out the drill pipe.

It is therefore an object of this invention to provide a pump which is attachable to the top of a string of drill tubing which is capable of forcing liquid into the drill tubing at a very high pressure.

With the foregoing and other objects in view which will be made manifest in the following detailed description and pointed out in the appended claims, reference is had to the accompanying drawings for an illustrative embodiment of the invention, wherein:

Figure 1 is a side elevation of the improved pump;

Fig. 2 is a vertical section taken substantially on the line 2—2 of Fig. 1;

Fig. 3 is a horizontal section taken on the line 3—3 of Fig. 1, which line is also designated by the characters 3—3 upon Fig. 2; and Fig. 4 is a vertical section taken substantially on the line 4—4 of Fig. 3.

Referring to the accompanying drawings wherein similar reference characters designate similar parts throughout, the pump consists of a member 10 having its lower end reduced at 11 which is threaded as at 12 so as to permit the pump to be mounted by means of a collar 13 upon the upper end of a string of drill tubing 14. In the lower end of the member 10 there is formed a bore 15, which bore has its upper end communicating with a radial bore 16 formed in the member 10 and which radial bore 16 has its outer end closed by means of a plug 17. A longitudinally extending bore 18 is formed in the member 10 and communicates with the radial bore 16 and a second radial bore 19. The lower end of the longitudinal bore 18 is closed by means of a plug 20 and the outer end of the radial bore 19 is closed by means of a removable plug 21.

A cylinder 22 is provided within the member 10, which cylinder has a passage communicating with it and with the drill tubing 14 formed of the bores 15, 16, 18 and 19. A check valve 23 is mounted within the bore 15, which check valve consists of a cage 24 secured within the bore 15 and which cage encloses a ball 25 adapted to seat upon the cage so as to prevent upward flow through the bore 15.

The upper end of the member 17 is threaded, as at 26, to receive a head 27. The head 27 is provided with an annular recess 28 and with a second annular recess 29, these recesses being adapted to cooperate with a piston rod 30 to form annular grooves. Within the recess 28 there is disposed packing 31 adapted to be compressed about the piston rod 30 by means of a gland member 32. The piston rod 30 is provided with a longitudinally extending bore 33 communicating with the cylinder 22 by means of a radial bore 34. The upper end of the bore 33 is provided with a ball check valve 35 adapted to prevent upward movement of fluid through the bore 33. The upper end of the piston rod 30 is adapted to be attached to the lower end of a "kelly" 36 and to be reciprocated thereby within the cylinder 22. The lower end of the piston rod 30 is threaded, as indicated at 37, so as to receive a nut 38 against which is adapted to be placed a suitable washer 39.

A gland-shaped member 40 is adapted to be screwed on to the lower end of the piston rod 30 and to be held in position by means of a lock nut 41. Packing 42 is disposed about the reduced portion of the gland-shaped member 40. The nut 38, washer 39, gland-shaped member 40, packing 42 and the lock nut 41 constitute a piston carried by the piston rod 30 which is reciprocable within the cylinder 22. A drain port 43 is formed in the side of the member 10 and communicates with the cylinder 22 below the piston. The periphery of each of the nuts 38 and 41 and of the gland-shaped member 40 has formed thereon a plurality of recesses 44.

If for any reason it is desired to loosen the nut 41 and the gland-shaped member 40, a suitable rod may be inserted through the drain port 43 into one of the recesses 44, and the piston rod 30 may be rotated, thereby causing either one or both of the nut 41 and the gland-shaped member 40 to be loosened or tightened upon the piston rod 30. If it is desired to loose or tighten the nut 38, the plug 21 is removed and the rod is inserted through the bore 19 and is received within one of the recesses formed upon the nut 38 when the piston is in its uppermost position.

In the event that the drill at the bottom of the drill pipe becomes plugged and it is desired to force out the plugging material or if for any reason it is desired to materially increase the pressure of circulation fluid in the drill pipe, the drill pipe is raised and is supported by the slips on the conventional rotary table. The kelly is then detached from the top of the drill pipe and the improved pump is applied to the top of the drill pipe. The kelly is then fastened to the top of the piston rod 30.

The operation of the pump is as follows: Fluid enters the bore 33 through the kelly 36 and passes from the bore 33 into the cylinder 22. When the cylinder 22 is approximately filled with fluid, the kelly 36 and the piston rod 30 carried thereby are caused to be lifted, thereby positively forcing the fluid through the passage formed by the bores 19, 18, 16 and 15 into the drill tubing 14. The fluid cannot be forced backwardly through the bores 34 and 33 because of the check valve 35. The fluid upon being forced through the passage provided by the bores 19, 18, 16 and 15 passes by the check valve 23 and after having entered the drill tubing 14 cannot pass upwardly and backwardly toward the cylinder 22. The purpose of the groove provided by the recess 29 is to provide communication between the end of the bore 34 and the cylinder 22, even though the piston carried by the piston rod 30 is in its uppermost position. If for any reason the fluid should slip by the packing 42 into the bottom of the cylinder 22, this fluid flows out through the drain port 43 formed in the member 10. After circulation has been again established through the drill, the kelly 36 is detached from the piston rod 30 and the pump is removed or detached from the top of the drill pipe. The kelly is then attached to the top of the drill pipe and drilling is proceeded as before.

It is seen that an improved pump is provided which is capable of forcing fluid downwardly through the drill tubing at substantially any pressure desired, depending upon the force with which the kelly 36 lifts the piston rod 30 and the piston carried thereby.

Passages 46 and 47 are formed in the member 10 above and below the check valve 23. In these passages there are mounted removable plugs 48 and 49 respectively. If for any reason there should be air in the cylinder 22 when the pump is started to operate, removal of the plug 48 will permit the escapement of this air and will not cause it to be forced into the drill tube 14. When it is desired to allow the fluid under pressure within the drill tube 14 to escape, the plug 49 may be removed and this permits the fluid to pass through the passage 47, while the check valve 23 may be closed. If desired, suitable valves, which may be hand operated, may be substituted for the removable plugs 48 and 49.

It will be understood that various changes in the detail of construction may be made without departing from the spirit or scope of the invention as defined by the appended claims.

I claim:

1. A pump comprising a cylinder attachable to a string of drill tubing, there being a passage connecting said cylinder with the drill tubing, a piston adapted to reciprocate within said cylinder, means for admitting fluid to said cylinder, said passage being so arranged that fluid will be forced therethrough downwardly into the drill tubing upon upward movement of said piston.

2. A pump comprising a cylinder attachable to a string of drill tubing, a piston rod carrying a piston reciprocable within said cylinder, means for attaching said piston rod to a kelly so as to be reciprocated thereby a passage formed in said piston rod permitting fluid to enter said cylinder through said kelly and passage, and means for discharging fluid from said cylinder into said drill tubing upon upward movement of said piston.

3. A pump attachable to a string of drill tubing comprising a cylinder, there being a passage provided with a check valve for permitting fluid to be discharged from said cylinder into said drill tubing connecting said cylinder with said drill tubing, a piston rod and a piston carried thereby reciprocable in said cylinder, a passage formed in said piston rod for admitting fluid to said cylinder, and a check valve in the last mentioned passage, said piston being attachable to a kelly so as to be reciprocated thereby causing fluid to be forced from said cylinder into said drill tubing upon the upward stroke of the piston.

4. A pump attachable to a string of drill tubing comprising a cylinder, there being a passage provided with a check valve for permitting fluid to be discharged from said cylinder into said drill tubing connecting said cylinder with said drill tubing, a piston rod and a piston carried thereby reciprocable in said cylinder, a passage formed in said piston rod for admitting fluid to said cylinder, a check valve in the last mentioned passage, said piston being attachable to a kelly so as to be reciprocated thereby causing fluid to be forced from said cylinder into said drill tubing upon the upward stroke of said piston, and a drain port communicating with said cylinder beneath said piston.

5. In combination with a string of drill tubing, a pump for forcing fluid downwardly within the string comprising a cylinder, a piston reciprocable within said cylinder, means providing an inlet and an outlet to said cylinder, check valves in said inlet and outlet, one of the parts being attachable to the drill tubing and the other being attachable to a kelly, so as to be reciprocated thereby, said pump being so constructed that upon the upward movement of the kelly, fluid will be forced from the cylinder through the outlet and into the drill tubing, and upon the downward stroke fluid will be admitted to the cylinder.

6. In combination with a string of drill tubing, a pump for forcing fluid downwardly within the string comprising a cylinder mounted adjacent the top of the string, means providing an outlet passage from adjacent the top of the cylinder to the interior of the drill tubing, a piston reciprocable in said cylinder having a piston rod attachable to a kelly so as to be reciprocated thereby, means providing an inlet passage through the piston rod which communicates with said cylinder above the piston, and check valves in said inlet and outlet passages, said pump being so constructed that upon upward movement of said piston, fluid will be forced from the cylinder into the drill tube, and upon downward movement of the piston fluid will be admitted to the cylinder above the piston.

7. In combination with a string of drill tubing, a pump for forcing fluid downwardly within the string comprising a cylinder mounted adjacent the top of the string, means providing an outlet passage from adjacent the top of the cylinder to the interior of the drill tubing, a piston reciprocable in said cylinder having a piston rod attachable to a kelly so as to be reciprocated thereby, means providing an inlet passage through the piston rod which communicates with said cylinder above the piston, check valves in said inlet and outlet passages, said pump being so constructed that upon upward movement of said piston, fluid will be forced from the cylinder into the drill tubing, and upon downward movement of the piston, fluid will be admitted to the cylinder above the piston, and means providing a drain port at the bottom of the cylinder.

In testimony whereof I have signed my name to this specification.

BERTEL M. JENSEN.